United States Patent [19]
Rozeboom

[11] 4,053,070
[45] Oct. 11, 1977

[54] RETRIEVING VEHICLE

[76] Inventor: Tunis Junior Rozeboom, 10329 Springwood Drive, Holland, Mich. 49423

[21] Appl. No.: 637,151

[22] Filed: Dec. 3, 1975

[51] Int. Cl.² ............................................. B60P 1/28
[52] U.S. Cl. .................................... 214/505; 214/510
[58] Field of Search ............... 214/83.24, 83.3, 505, 214/518, 85, 85.1, 85.5, 523, 77 R, 92, 94, 501, DIG. 3, DIG. 4, 510, 82; 180/77 S, 89 R, 54 R, 54 C

[56] References Cited
U.S. PATENT DOCUMENTS

| | | | |
|---|---|---|---|
| 2,747,886 | 5/1956 | Lee | 180/77 S X |
| 2,785,763 | 3/1957 | Stump | 180/54 C |
| 2,911,118 | 11/1959 | Tapp | 214/77 R |
| 3,013,676 | 12/1961 | Daniels, Jr. | 214/85.1 X |
| 3,885,686 | 5/1975 | Siebring | 214/77 R |
| 3,944,095 | 3/1976 | Brown | 214/85.5 X |
| 3,971,484 | 7/1976 | Anderson et al. | 214/85.1 X |

*Primary Examiner*—Albert J. Makay
*Attorney, Agent, or Firm*—Glenn B. Morse

[57] ABSTRACT

A vehicle has a moveable bail adapted to engage articles lying on the ground and pull them up unto one end of a storage deck, and also eject them normally from the opposite end. The bail is reversible to provide a full sweep over the deck area at a position spaced above the deck.

8 Claims, 43 Drawing Figures

RETRIEVING VEHICLE

BACKGROUND OF THE INVENTION

The present invention was developed in response to the problems encountered in harvesting hay. Under current practices, the cutting of the hay is closely followed by a baling operation which discharges the completed bales on the ground as the equipment proceeds along the field. These bales are then retrieved and transported to storage or cattle-feeding areas. This retrieval has been accomplished either through the use of forklifts, or by inclinable conveyor-like devices in which the chains are equipped with projecting hooks for engagement with the bales. Either of these pickup machines can operate in conjunction with an auxiliary wagon or vehicle having a storage deck on which the bales can be accumulated so that it becomes unnecessary to head back to the central collecting area with each bale.

The old familiar rectangular bale is being replaced by a cylindrical bale that may be anywhere from 4 to 8 feet in diameter. Experience has shown that these bales possess a very desirable characteristic which follows from the progressive tangential development of the bale in the forming machine. The directional lay of the hay provides a water shed similar to that of a thatch roof. For this reason, these large cylindrical bales can be left standing in the field for long periods of time without risk of spoilage. The bales are usually held together by circumferential strands of twine, and a serious problem has developed in the retrieval of these bales with conventional pickup equipment. Shoving the tines of a fork-life under a bale in the field has a tendency to disturb the binding strands, which is a difficulty added to the obvious problem of requiring an auxiliary following vehicle to accumulate the bales. When the conveyor-type device is used, the efforts to pull the bale up the incline are complicated by the tendency of the bale to roll back down, as a result of its cylindrical configuration. An attempt to vigorously engage the hooks of the conveyor with the bale produces a tendency to tear the binding strands loose, and claw the bale apart. These problems seem to be inherently associated with these pickup machines, and the present invention has been developed to provide a different approach to handling these rather ungainly objects.

SUMMARY OF THE INVENTION

A vehicle is provided with a storage deck preferably elongated in the normal direction of movement of the vehicle. An end portion of the deck is adapted to function as a loading ramp. A track extends along the opposite sides of the deck, and the opposite ends of a bail are respectively pivotally connected to carriers riding in these tracks. A "bail" is a U-shaped beam connected at its ends, in contrast to a "bale", which is a package or bundle of hay. Interrelated endless chains induce corresponding movement of the carriers to pull objects up the ramp and along the deck with the bail to a point of discharge. The bail is reversible to provide a full sweep over the deck area in a plane spaced above the deck. The transversed portion of the bail can be dropped over an object resting on the ground at the end of the ramp. The vehicle is particularly adapted to pick up and transport cylindrical bales of hay.

DESCRIPTION OF THE PREFERRED EMBODIMENTS

Figures 25, 26:
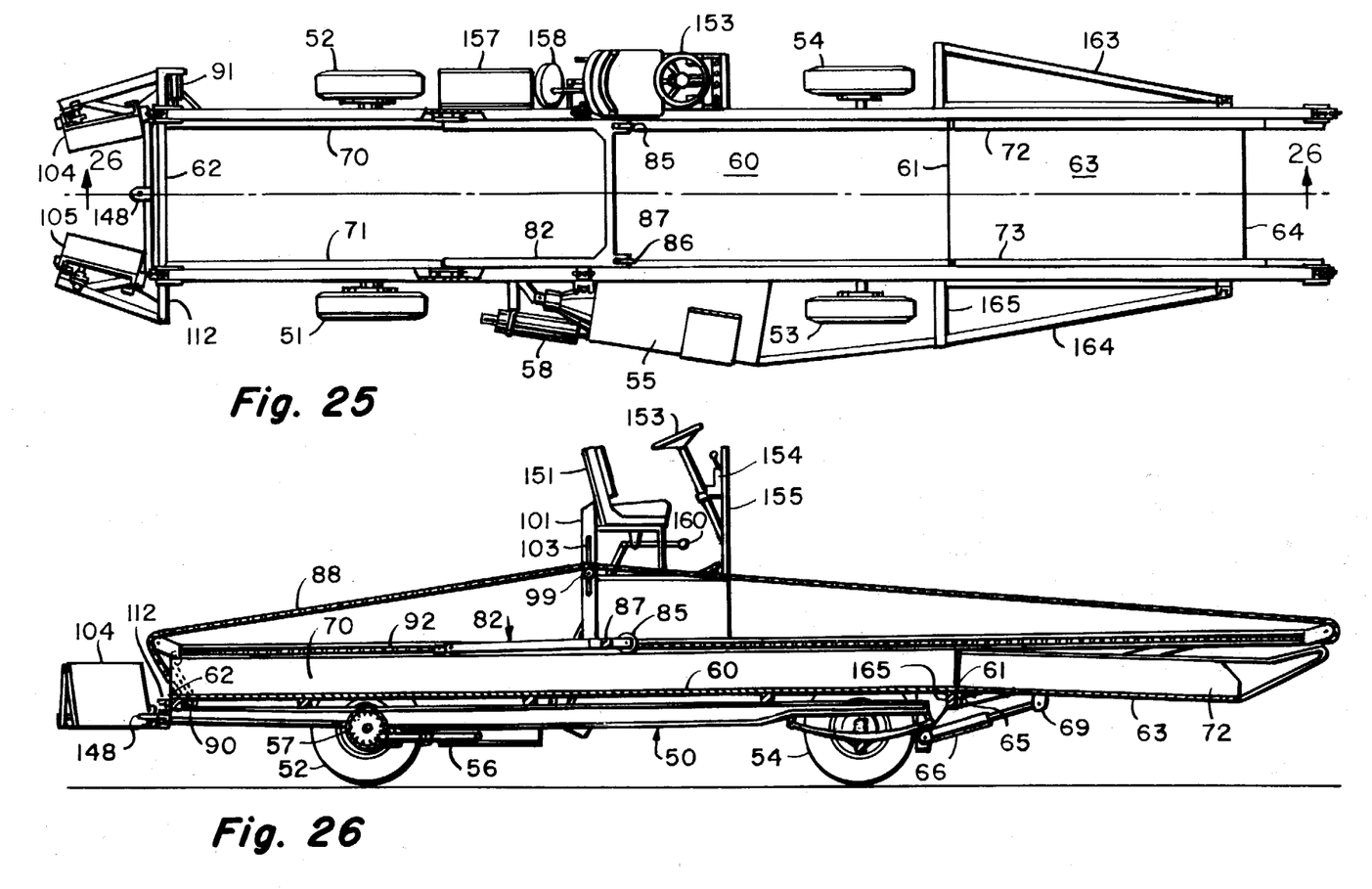
FIG. 25 is a plan view of the vehicle shown in FIG. 1.
FIG. 26 is a side elevation with respect to FIG. 25.
Figures 27, 28, 29, 30, 31, 32:
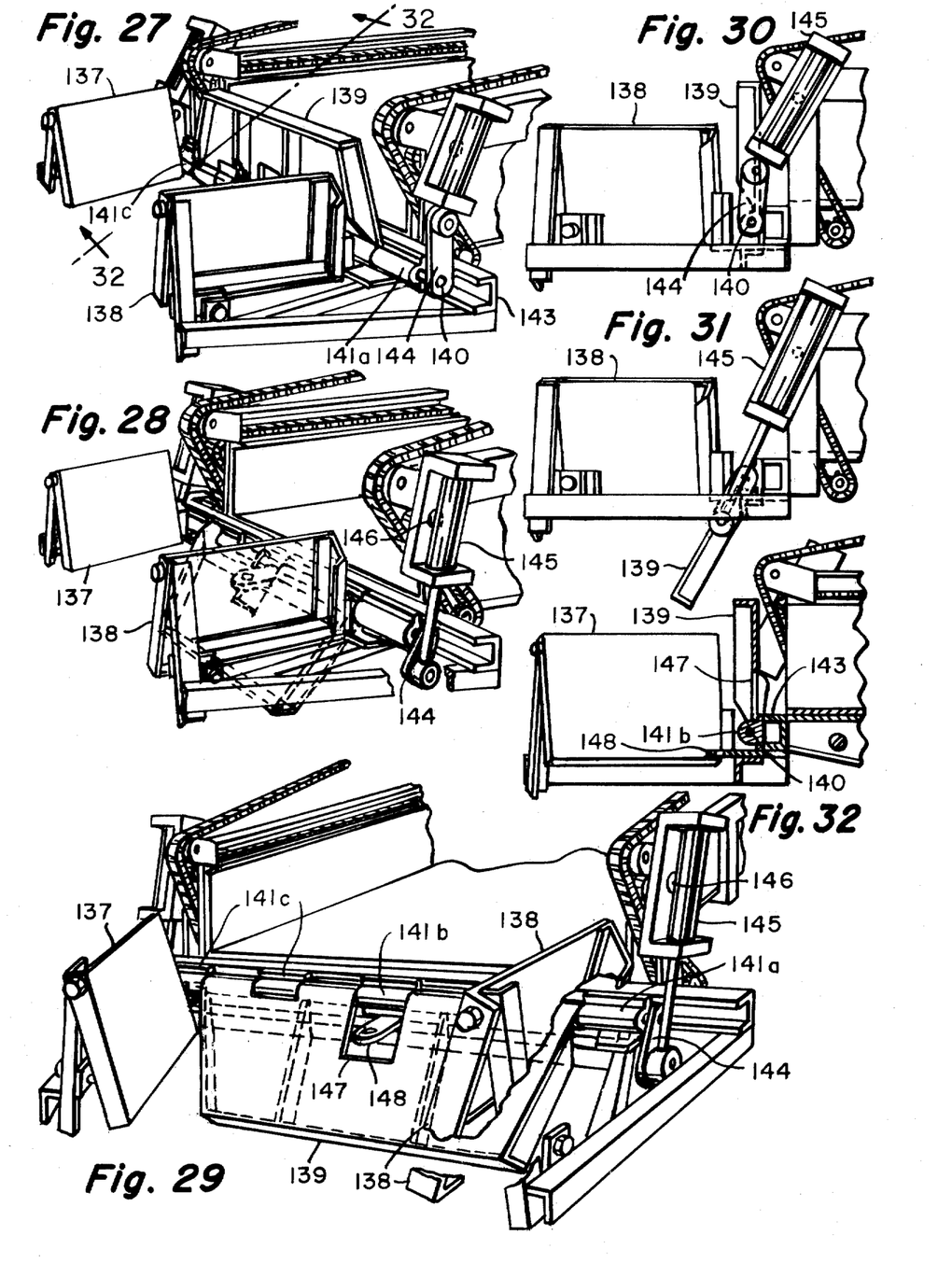
FIG. 27 is a perspective view of the rear portion of the vehicle, showing a modified form of the invention incorporating a tailgate arrangement.
FIG. 28 is a view similar to FIG. 27, showing the tailgate in the lowered position.
FIG. 29 is a perspective view similar to FIG. 28, from a position more closely approaching a rear elevation, and on an enlarged scale.
FIG. 30 is a side elevation of the rear portion of the vehicle, as shown in FIG. 27.
FIG. 31 is a side elevation with respect to FIGS. 28 and 29.
FIG. 32 is a section on the plane 32—32 of FIG. 27.
Figure 33:
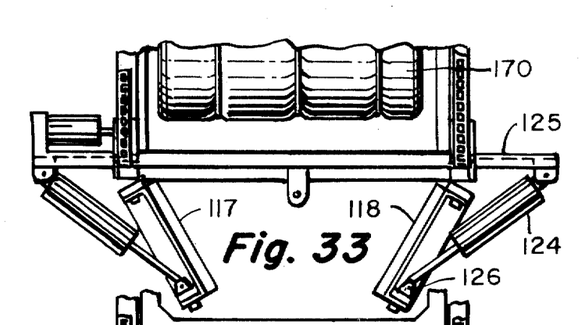
FIG. 33 illustrates a modified form of the invention at the rear portion of the vehicle, incorporating hydraulically-operated devices for grasping the ends of the bales.
Figure 34:
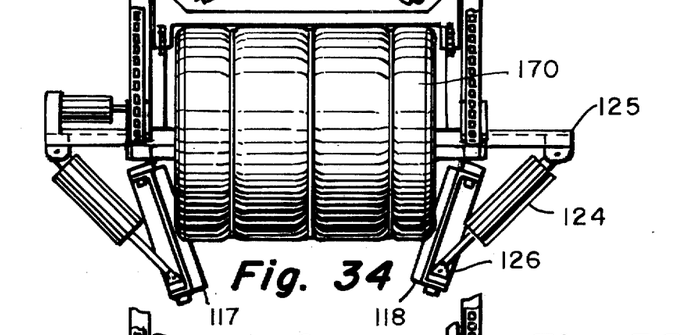
FIG. 34 is a plan view showing the engagement of the structure shown in FIG. 3 with a bale of hay as it is being ejected.

The frame of the vehicle is indicated generally at 50. This frame is preferably part of a standard truck chassis providing the driven wheels 51 and 52, and the steerable wheels 53 and 54. The housing indicated at 55 contains a standard gasoline engine driving the rear wheels 51 and 52 through a diagonally-arranged drive shaft 56 (refer to FIG. 26) extending to the central differential unit 57, which is of standard construction. A standard muffler 58 receives the exhaust from the engine within the housing 55 through the pipe 59.

A fixed deck structure 60 is secured to the frame 50 of the vehicle, and extends from the junction at 61 to the rear extremity 62, from which bales of hay are discharged. A moveable portion 63 of the deck structure is capable of being lowered at the front end 64 to form a ramp leading up to the plane of the fixed portion 60. (Refer to FIG. 25). The ramp section 63 is pivotally mounted on the frame at 65, and is positioned by the hydraulic cylinder units 66 and 67 extending between brackets as shown at 68 (secured to the frame 50) and 69 (secured to the underside of the ramp section 63). The fixed portion 60 of the deck has fences as shown at 70 and 71 on the opposite sides, and the fences 72 and 73 on the ramp section 63 form continuations in coplanar relationship.

Figures 5, 6, 7, 8:
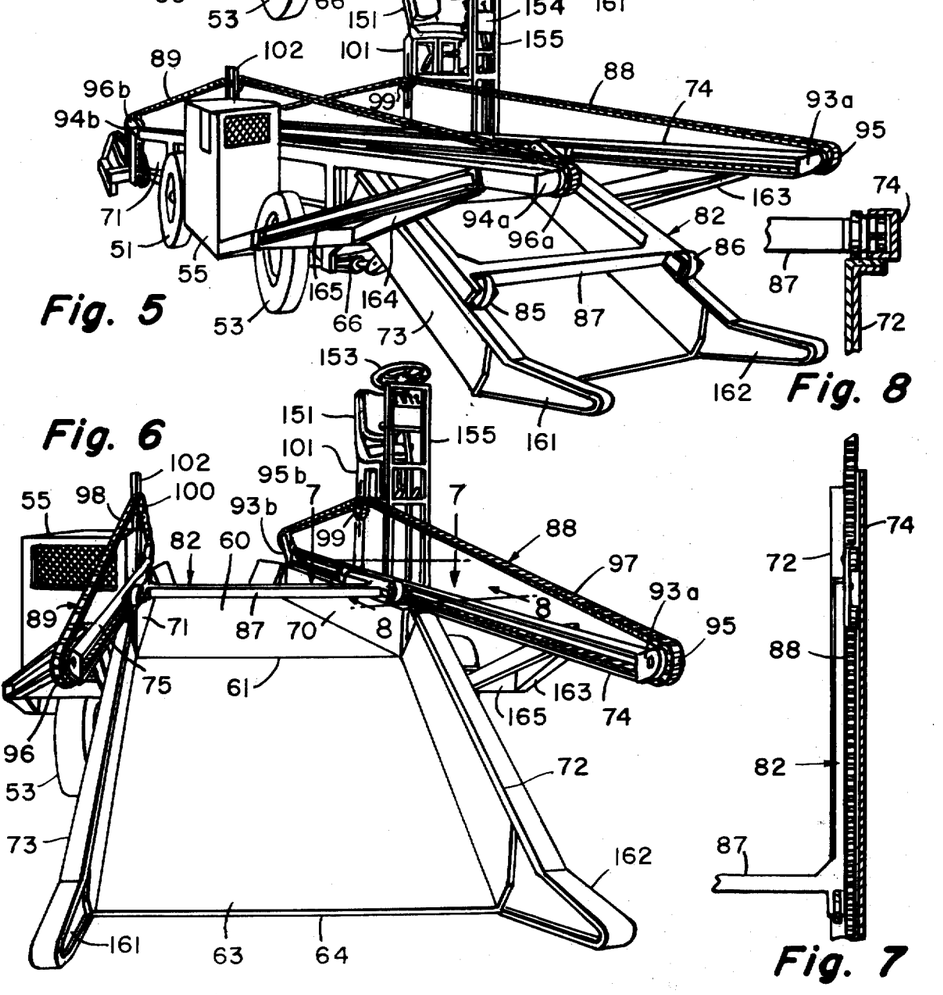
FIG. 5 is a view similar to FIG. 4, with the loading ramp lowered.
FIG. 6 is a perspective view from the front of the vehicle in a position similar to that shown in FIG. 5, except that the bail unit is retracted to position over the fixed portion of the deck.
FIG. 7 is a fragmentary top view of the area indicated at 7—7 in FIG. 6.
FIG. 8 is a fragmentary section on the plane 8—8 of FIG. 6, on an enlarged scale.
Figures 9, 10, 11, 12:
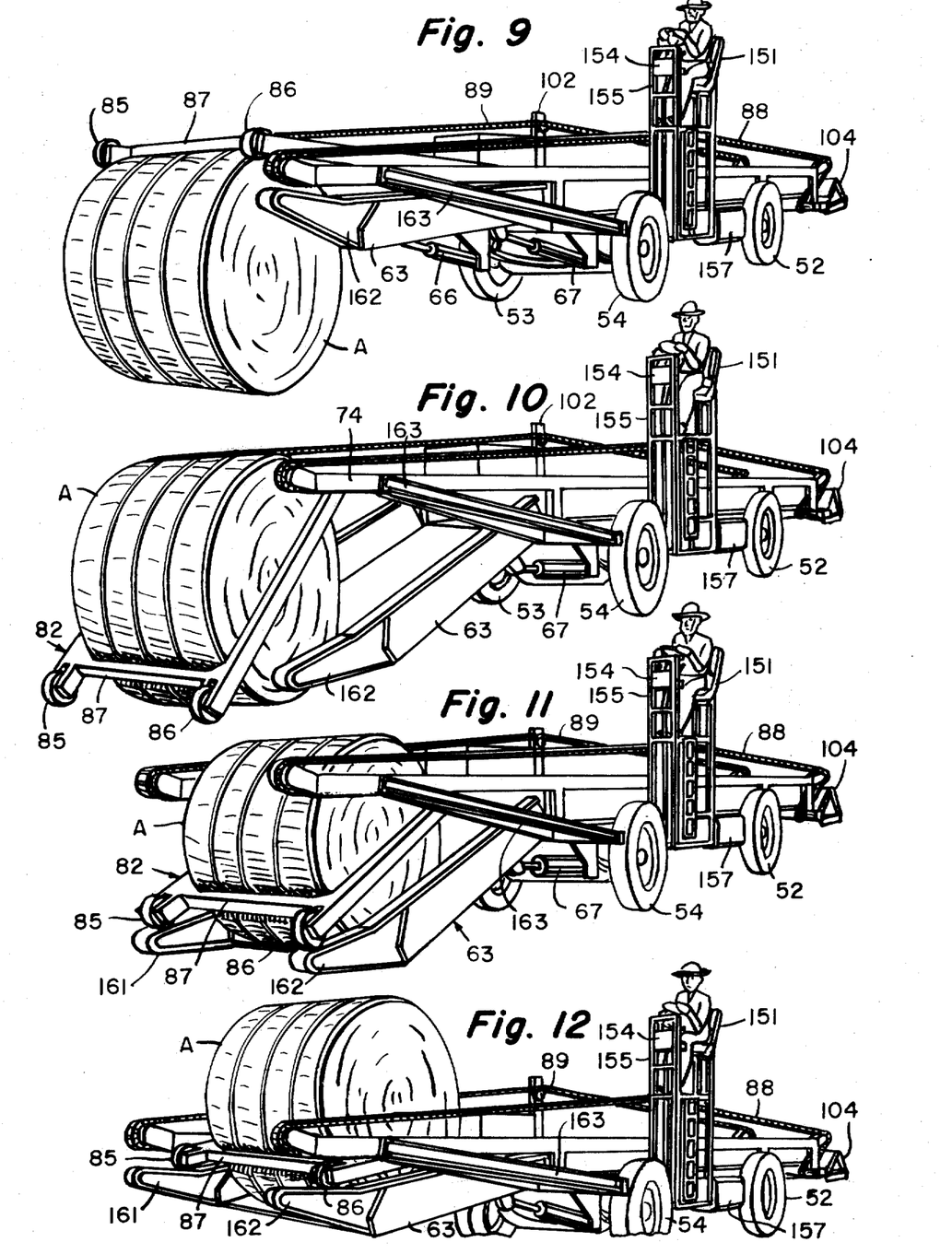
FIG. 9 is a perspective front quarter view of the machine as it would approach a cylindrical bale of hay preparatory to pulling it on to the deck of the vehicle.
FIG. 10 is a view of the next succeeding step in the loading operation after that of FIG. 9, in which the bail unit has been dropped over the cylindrical bale.
FIG. 11 illustrates the condition of the machine as the bale of hay is being pulled up the loading ramp.
FIG. 12 illustrates the next succeeding stage of the operation, in which the loading ramp is elevated into a position approaching a coplanar relationship with the fixed portion of the deck.
Figure 13:
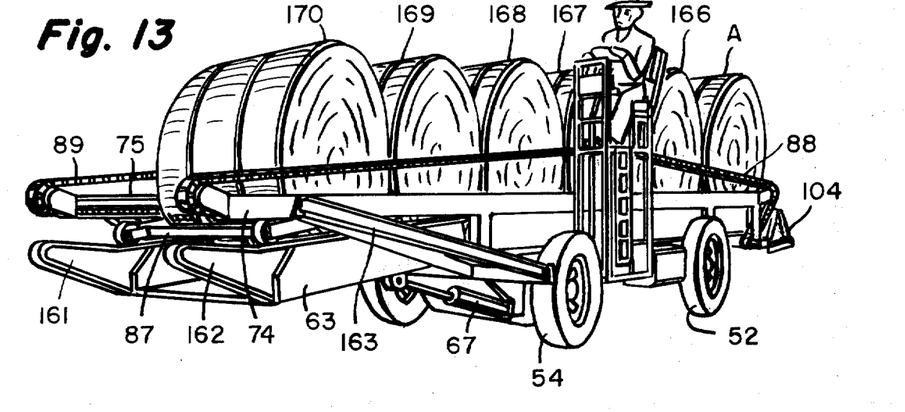
FIG. 13 is a perspective view showing the fully loaded retrieving vehicle.

Referring to FIGS. 6 and 8, a channel 74 is secured to the top of the fence 70, and extends forward to a point slightly beyond the end 64 of the ramp section 63. A similar channel 75 is mounted on the top of the fence 71 at the opposite side of the vehicle. These two channels open inwardly, and form tracks for the carriers 76 and 77, each of which is equipped with rollers as shown at 78-79 and 80-81 for interengagement with the respective channels. The ends of the bail unit 82 are pivotally connected to the carriers 76 and 77 at 83 and 84. The central rollers 85 and 86 ride on the tops of the fences 70-73, causing the central portion 87 of the bail to sweep across the deck area at a position spaced above the deck by the height of the fences. This central portion 87 is the portion of the structure that actively engages the retrieved objects to pull them up on to the deck, and discharge them at the rear end. Movement of the bail unit 82 is induced by the endless chains 88 and 89, each of which engages a sprocket fixed to a shaft 90 rotatably mounted in conventional bearings secured to the frame 50, and driven by the hydraulic motor 91. One section of these chains rides within the channels as shown at 92 in FIG. 26. The front and rear extremities of the channels are provided with brackets as shown at 93a-b and 94a-b supporting the idler sprockets 95a-b and 96a-b, and the return courses 97 and 98 pass over the adjustable idler sprockets 99 and 100, respectively, which function as tension adjustments. These sprockets are mounted on stub shafts which can be moved vertically on the posts 101 and 102 within slots as shown at 103 in FIG. 26. The ends of a chain are connected respectively to the carriers 76 and 77 to induce the operating movement of the bail unit 82.

Figures 20, 21:
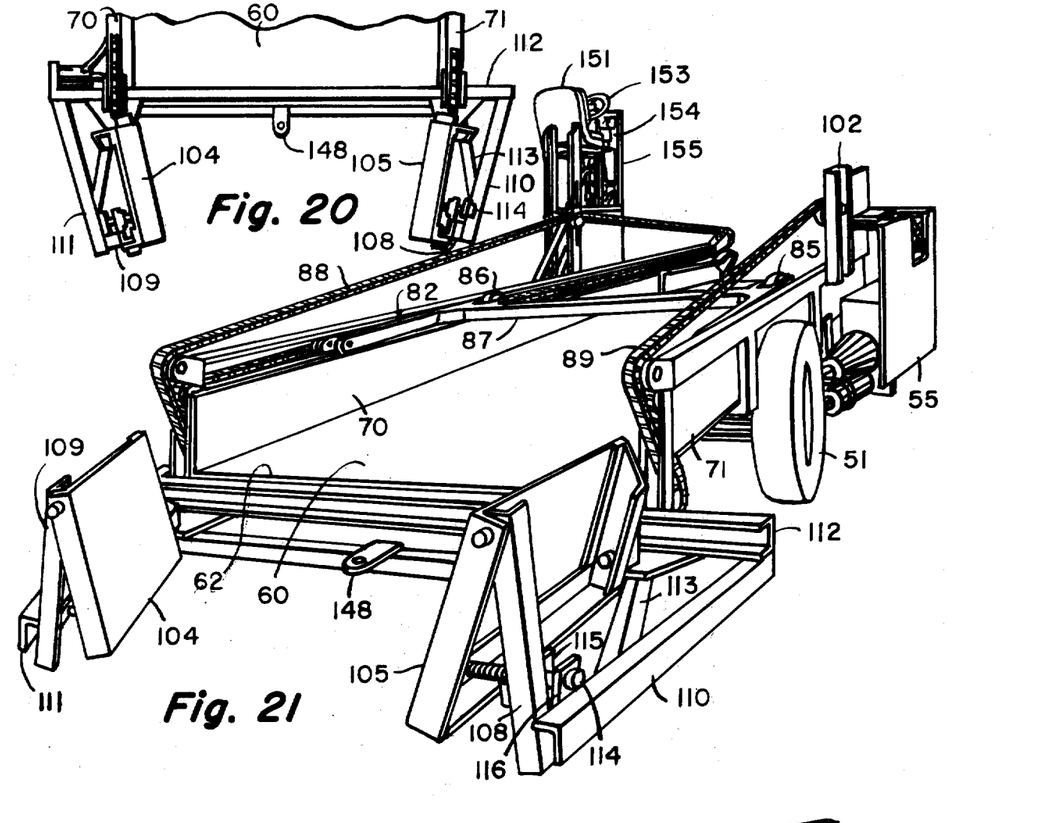
FIG. 20 is a plan view of the rear portion of the vehicle, showing the structure used to ease the bales down to the ground with a minimum of damage.
FIG. 21 is a perspective view at the rear quarter of the vehicle, showing the structure illustrated in FIG. 20.
Figure 22:
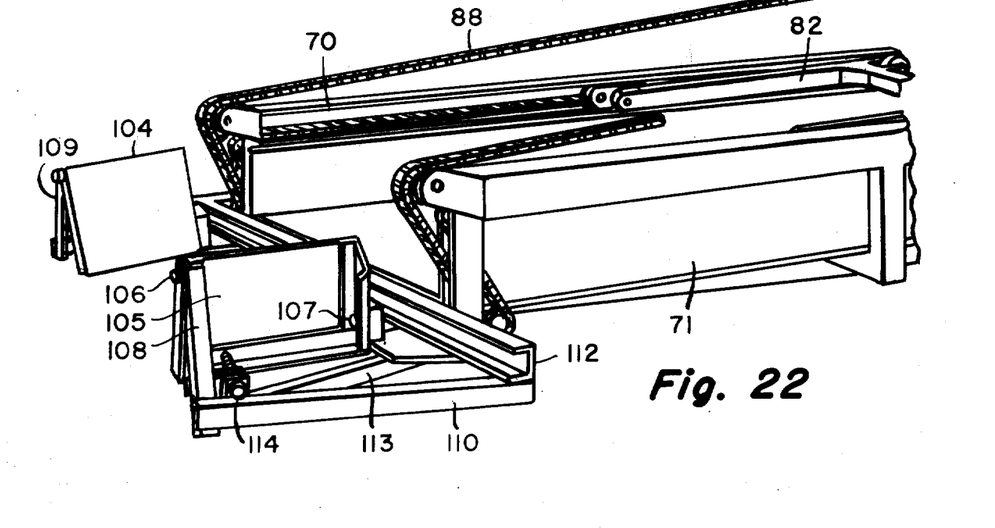
FIG. 22 is a perspective view of the rear portion of the vehicle, taken from a position close to a side view, and illustrating the structure appearing in FIG. 21.

In the preferred form of the vehicle, the rear portion of the deck 60 is not lowered to form a ramp. This results in dropping the bale from the deck level down to the ground, which would be likely to result in rupture of the bales if a free fall where permitted. Restraining plates as shown at 104 and 105 are mounted on the opposite sides of the rear of the vehicle for bearing engagement with the ends of the bales to generate a resistance to the falling movement. These plates can be set to adjustably fixed positions, as shown in FIG. 21, or they can be urged by hydraulic pressure (refer to FIGS. 33–37) or spring pressure (refer to FIGS. 38–43). In the simpler arrangement illustrated in FIGS. 20–22, the plates 104 and 105 are pivotally mounted at diagonally opposite corners as shown at 106 and 107 in FIG. 22. The pivotal connection at 106 is supported on the vertical members 108 and 109, which are respectively secured to the beams 110 and 111 extending to the transverse beam 112 secured to the frame of the vehicle. Diagonal braces as shown at 113 stiffen the support for the plates 104 and 105. The angular position of the plates about their respective pivot axes is controlled by adjustable bolts as shown at 114 in FIG. 21. These bolts have threaded engagement with the brackets 115 secured to the beams 110 and 111, and are directionally stabilized by the tabs 116 so that the opposite extremities of the bolts can bear on the marginal framework associated with the plates 104 and 105.

The arrangement for hydraulic actuation of the restraining plates illustrated in FIGS. 33-37 superimposes the hydraulic actuation on the angular adjustability illustrated in FIG. 21. The plates 117 and 118 are each pivotally mounted as at 119 and 120 (refer to FIG. 36) on a swinging frame 121 hinged as at 122 to the fence structure of the vehicle. The angular adjustability about the axis of the pivots 119 and 120 with respect to the swinging frame 121 is retained through the use of bolts 123 similar to the bolts 114 shown in FIG. 21. The effect of the adjustment controlled by these bolts is to control the degree of convergence between the plates 117 and 118 as the bales fall from the deck 60 down to the ground. The added movement provided by the FIGS. 33-37 arrangement centers in the control of the swinging movement of the frames 121 by the hydraulic cylinders 124. These extend from the outer extremities of the beam 125 to pivot connections at 126 on the frames 121. Effect of the application of pressure to the cylinders 124 is to increase the intensity of bearing on the plates 117 and 118 on the sides of the bales as they slip through to the ground.

Figures 35, 36:
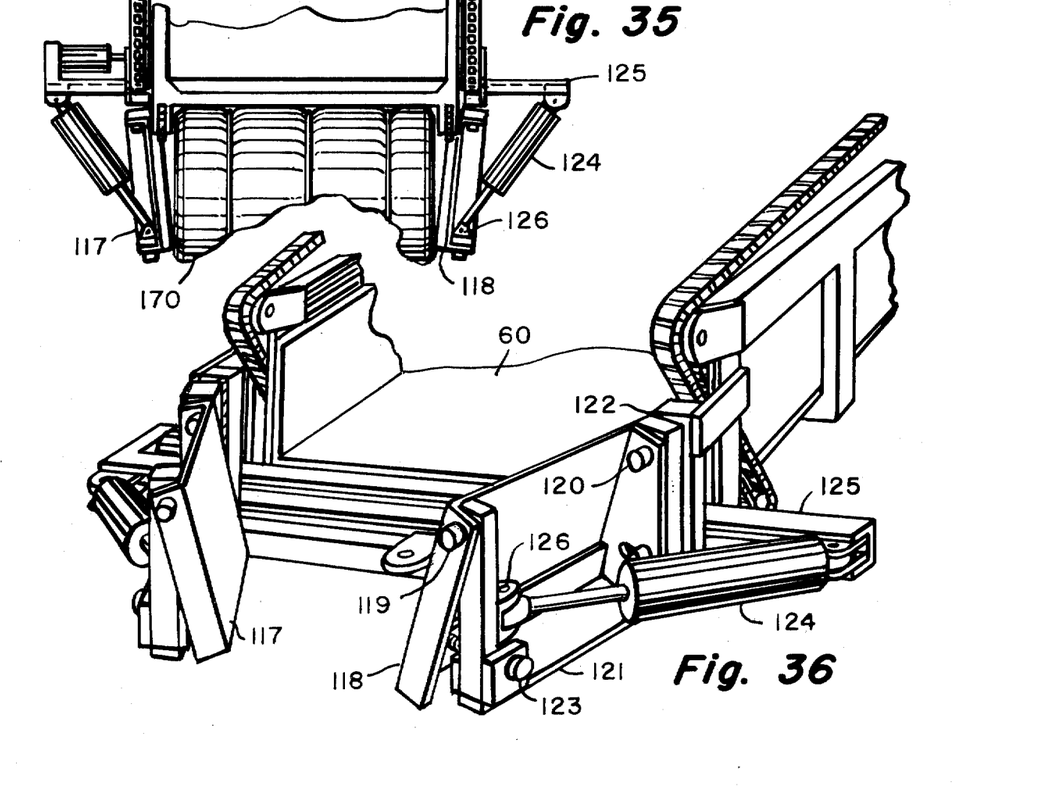
FIG. 35 is a plan view showing the last stage of the deposit of the bale, after it has moved through the FIG. 34 position.
FIG. 36 is a perspective view on an enlarged scale over that of FIGS. 33—35, showing the mechanism for operating the gripping devices.
Figure 37:
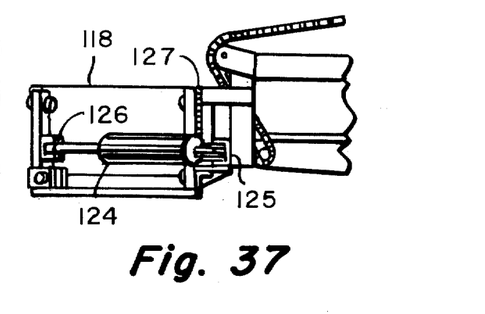
FIG. 37 is a side elevation with respect to FIG. 33.
Figures 38, 39, 40, 41, 42, 43:
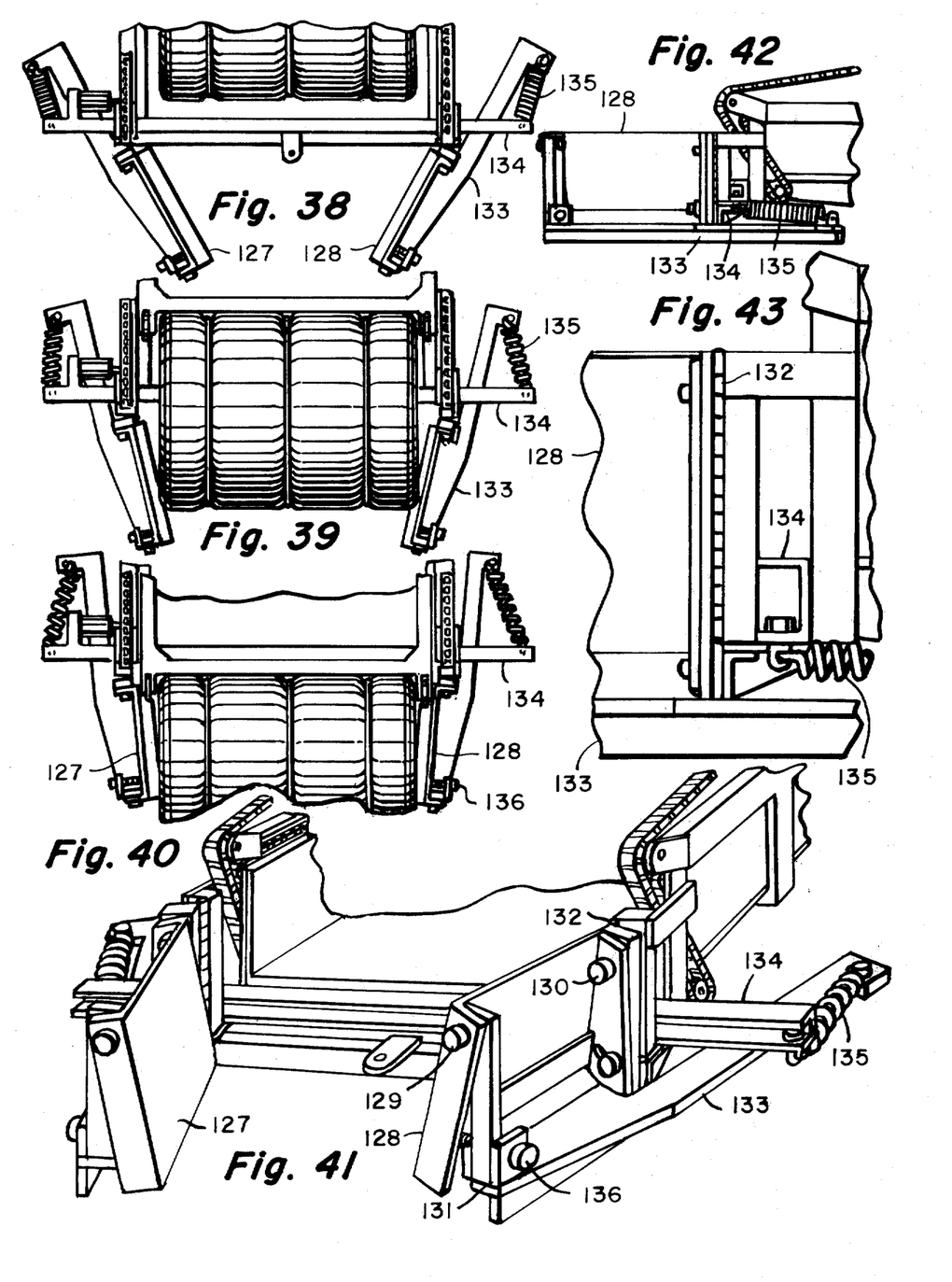
FIG. 38 illustrates a further modification of the invention with respect to the end-gripping devices, and illustrating a spring-loaded arrangement as an alternative to the hydraulic mechanism.
FIG. 39 illustrates the engagement of the ends of a bale with the mechanism as the bale is being pushed off the rear of the deck of the vehicle.
FIG. 40 illustrates the final deposit of the bale on the ground between the restraining devices.
FIG. 41 is a perspective view on an enlarged scale over that of FIGS. 38-40, showing the spring arrangement for controlling the pressure of the restraining unit.
FIG. 42 is a side elevation with respect to FIG. 38.
FIG. 43 is a side elevation, on an enlarged scale, with respect to FIG. 41.

The arrangements shown in FIGS. 38–43 has a function similar to the hydraulic actuation appearing in FIG. 36. The plates 127 and 128 are pivotally mounted at 129 and 130 on the swinging frames 131. (Refer to FIG. 41). These frames are hinged at 132 to the fence structure, as in the arrangement shown in FIG. 36. The frames 131 provided with an arm 133 extending below and beyond the transverse beam 134, so that a tension spring 135 can be connected between the ends of the arms and the ends of the beams 134 to generate a biasing action tending to close the gap between the plates 127 and 128. This presents a degree of resilience that increases progressively with the degree of opening of this gap, and the use of this modification presumes that the overall axial length of the bale is fairly uniform. The advantage of the hydraulic system is that the force applied to the ends of the bales does not progressively increase substantially as the plates swing apart. In this modification, the function of the adjustment of the bolts 136 is the same as that of the bolts 123 of FIG. 36.

FIGS. 27 to 32 illustrate a tailgate arrangement that may be used in conjunction with the vehicle to retain bales in storage position on the deck, particularly in cases where the terrain is relatively rough, or may involve relatively steep inclines tending to roll the bales off the back of the vehicle. In this modification of the invention, the restraining plates 137 and 138, and their support on the vehicle structure, are the same as that shown in FIG. 21. The tailgate 139 is mounted on a shaft 140 supported by bearings 141a-c secured to the beam 143, which may be considered as part of the frame of the vehicle. A crank arm 144 is mounted at one or both ends of the shaft 140, and the hydraulic cylinder unit 145 is pivoted to the fence structure at 146. Actuation of the cylinder unit can move the tailgate 139 from the FIG. 27 to the FIG. 28 position, with a pivot mounting at 146 accommodating the movement induced by the rotation of the crank arm 144. The tailgate 139 is provided with a cutout at 147 to accommodate the hitch tongue 148, which extends far enough to the rear to interfere with the down swing of the tailgate if the cutout where not present.

Figure 23:
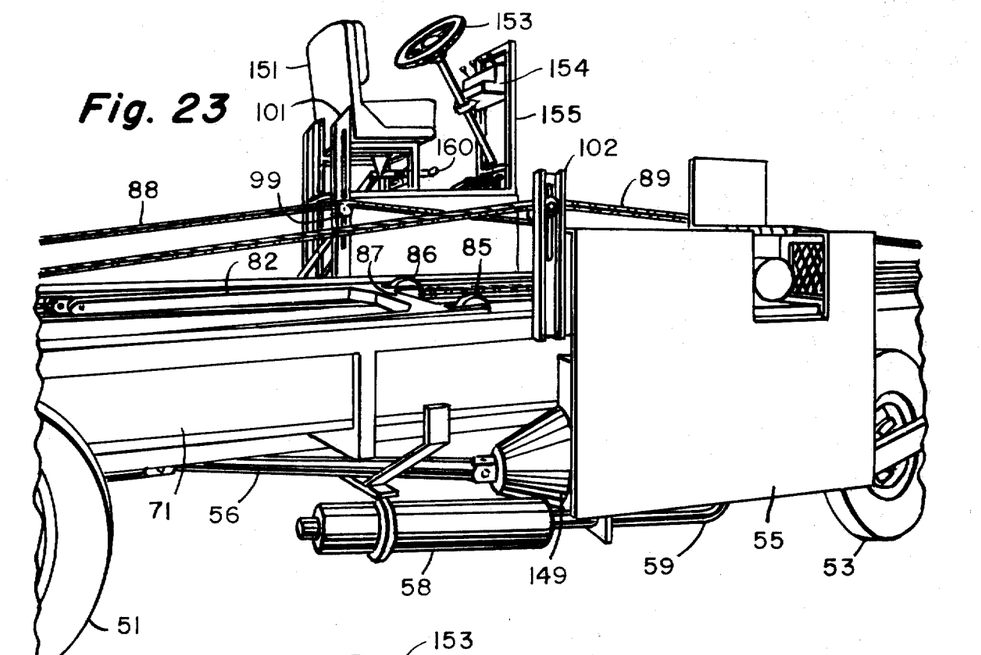
FIG. 23 is a perspective view at the side of the central portion of the vehicle.
Figure 24:
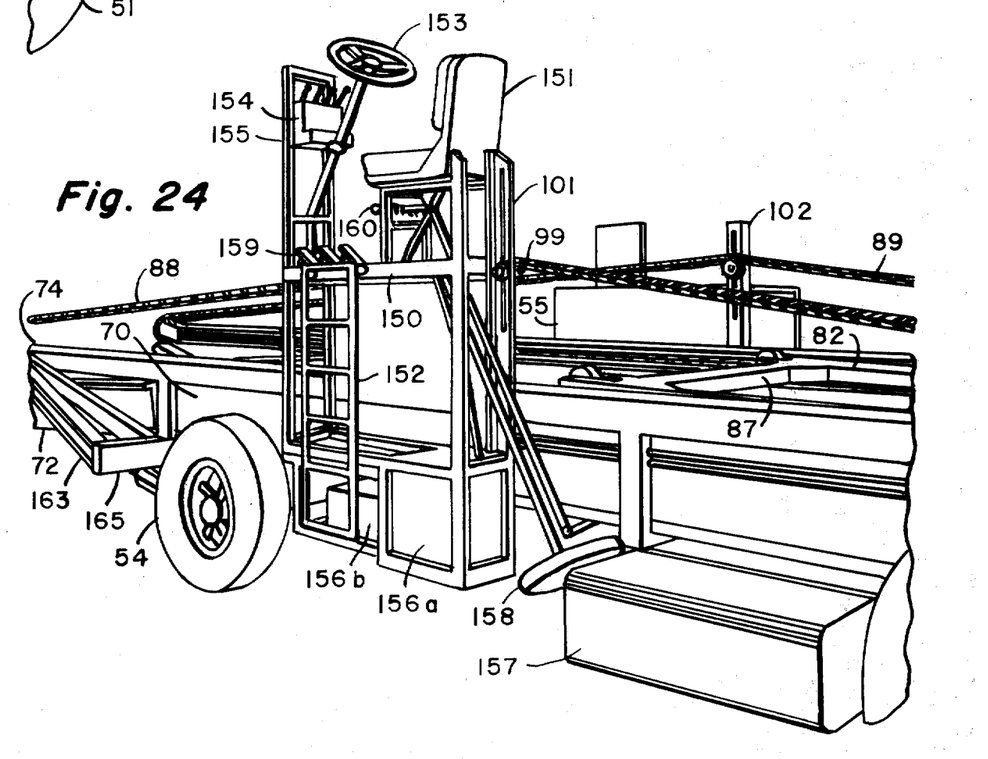
FIG. 24 is a perspective view of the central portion of the opposite side of the vehicle from that shown in FIG. 23.

The hydraulic pump used to actuate the various cylinders on the vehicle is not shown, but is preferably mounted within the housing 55. (Refer to FIGS. 23 and 24). This pump is driven by the motor 149, which provides the principal power for the vehicle. The control station of the vehicle is essentially an elevated platform structure 150 mounted on the frame of the vehicle at the opposite side from the housing 55, and containing the operator's seat 151. The ladder 152 assists the operator arriving at his control station, where the steering wheel 153 and the hydraulic control unit 154 are supported on the upright structure 155. The various levers associated with the control unit 154 determine the direction of movement of the hydraulic motor 91 delivering power to the chain systems 88 and 89, and also control the cylinders 66 and 67 positioning the ramp 63. Further controls would be provided, in the event that the hydraulic arrangements for a tailgate and for the restraining plates were used. An oil reservoir and associated equipment is indicated at 156a and 156b, respectively, mounted for convenience on the platform of structure. The oil pressure conduits of the vehicle have been omitted to avoid confusion. A gasoline tank is indicated at 157, and a component of the brake system at 158. The foot pedals indicated at 159 are associated with the ground movement of the vehicle, and the emergency brake control is indicated at 160.

Figures 1, 2, 3:
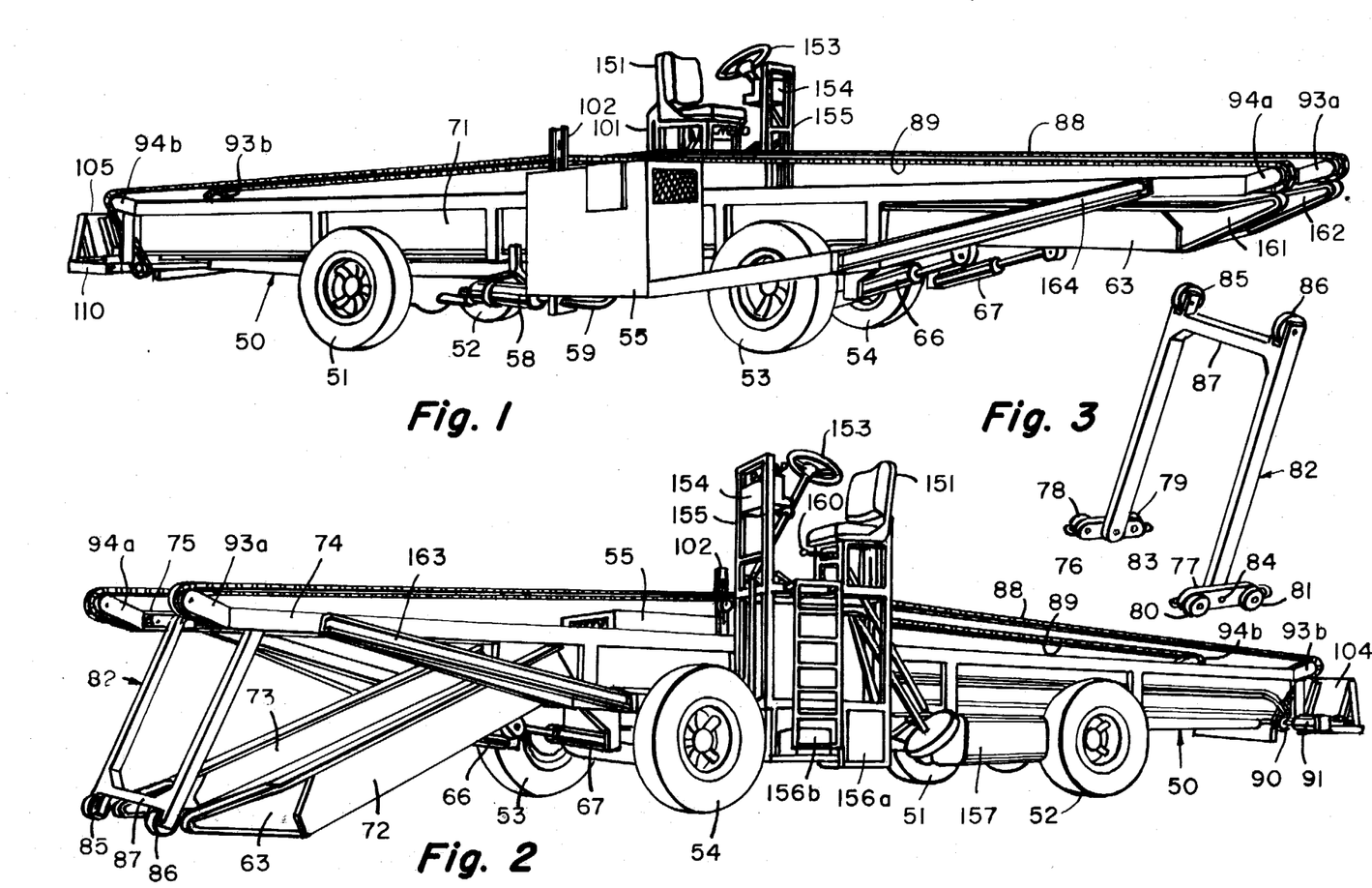
FIG. 1 is a perspective front quarter view of a vehicle emboding the preferred form of the invention.
FIG. 2 is a front quarter perspective of the vehicle shown in FIG. 1, from the opposite side.
FIG. 3 is a perspective view of the bail unit.
Figure 4:
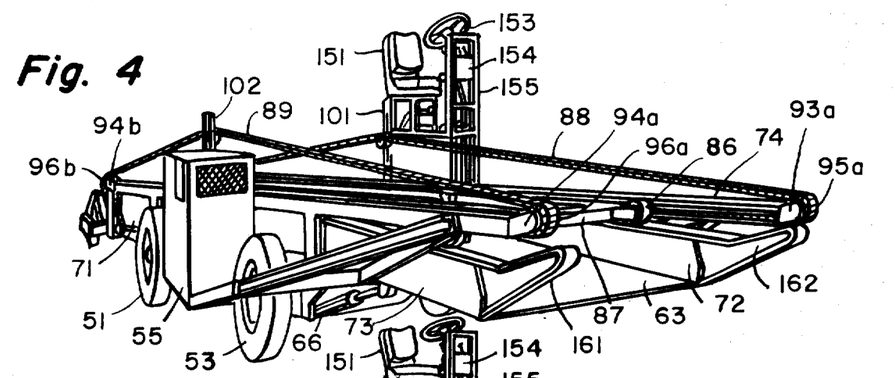
FIG. 4 is a perspective view of the vehicle shown in FIG. 1, from a position close to a front view, and with the loading ramp elevated.

The sequence of operations in loading the vehicle are illustrated in FIGS. 9 through 13. The vehicle in the FIG. 1 condition is driven up to a bale A so that the bale is received between the ends 161 and 162 of the ramp section 63. These two ends form bearing shoes resting on the ground in the FIG. 11 position. As the vehicle moves forward to the point that the bale A is embraced between the ends 161 and 162, the transverse portion 87 of the bail 82 moves over the top of the bale A. Subsequent lowering of the ramp section 63 to the FIG. 11 position results in dropping the central portion 87 over the bale, so that the load can be pulled up the ramp 63 onto the fixed portion 60 of the deck. During this movement, the forward extension of the tracks 74 and 75 is stabilized by the bracing structure 163 and 164 on the opposite sides of the vehicle, extending from the transverse beam 165 secured to the frame of the vehicle. After the cylindrical bale of hay A has been drawn well on to the ramp 63, the ramp may be elevated to the FIG. 12 position continued movement of the chains 88 and 89 can induce further rearward movement of the bale A toward the rear of the vehicle to the position shown in FIG. 13. Subsequent bales 166–170 are loaded in sequence in the same way.

Figure 14:
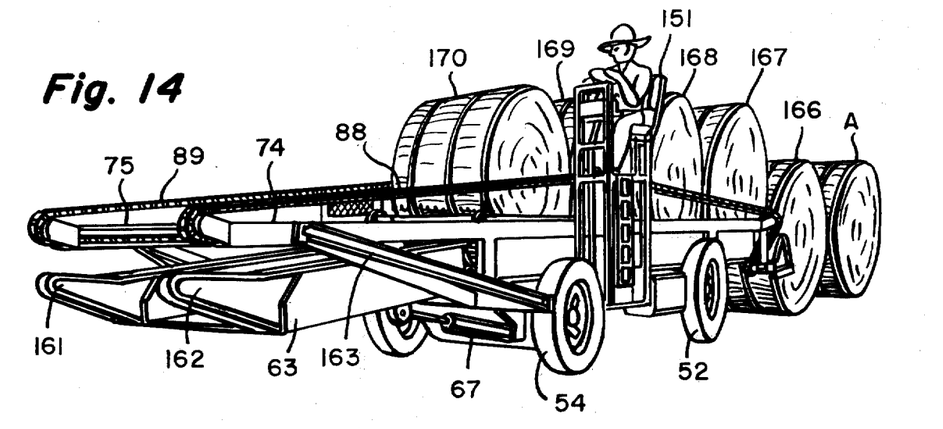
FIG. 14 illustrates the discharge of the bales over the back end of the vehicle.
Figure 15:
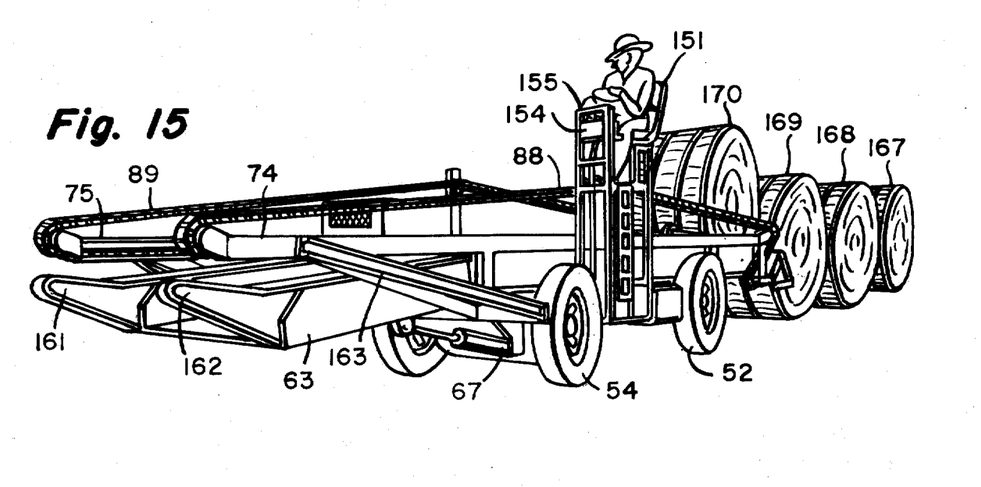
FIG. 15 shows the vehicle unloaded, except for the one last bale.
Figure 16:
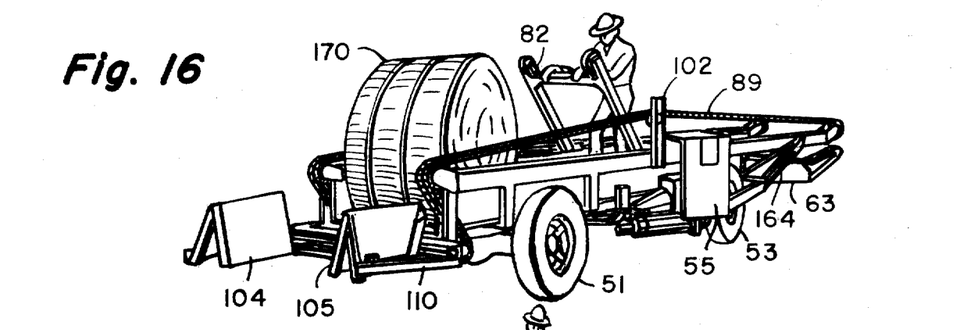
FIG. 16 illustrates the reversal of the bail unit preparatory to ejecting the last bale.
Figure 17:
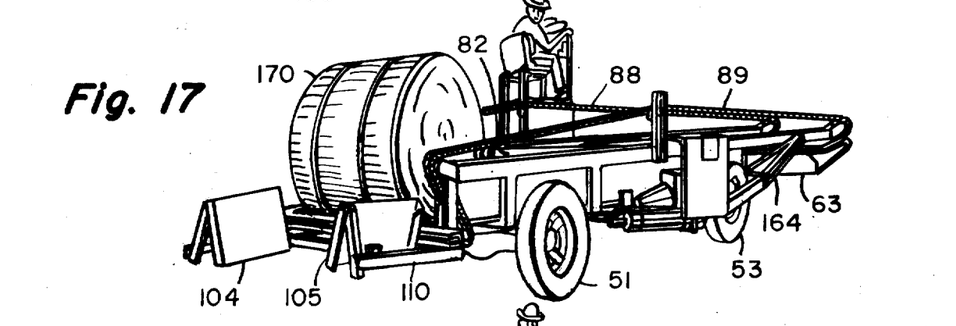
FIGS. 17, 18 and 19 illustrates successive stages in the ejection of the last bale.
Figure 18:
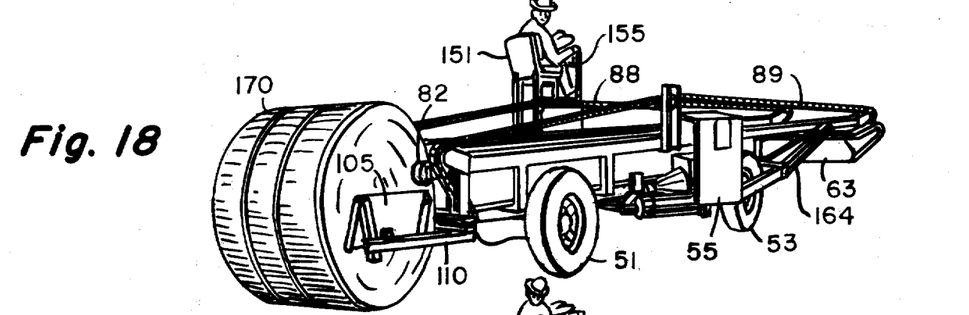
Figure 19:
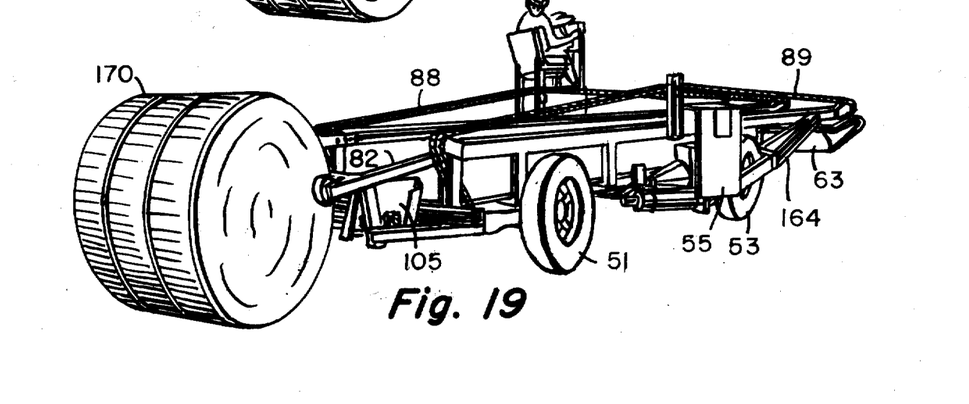

The bales are discharged on to the ground by continued rearward movement of the central portion 87 of the bale under the action of the chains 88 and 89, as shown in FIG. 14, until all but one of the bales has been pushed off. At this point, the direction of movement of the chains is reversed to bring the bail unit far enough forward so that it can be swung over through 180° as shown at FIG. 16. This dual position makes it unnecessary to extend the tracks in cantilever fashion beyond the rear of the vehicle. Once the bail is swung over, the conveyor chains 88 and 89 are again operated by the motor 91 to push the last remaining bale off between the restraining plates and on to the ground.

As an alternative arrangement, the bales may be pushed off the front of the vehicle by first moving the bail in the upright position so that it is behind one or more of the bales. This assumes that the sides of the bail are long enough to reach above the bales. A releasable latch on the carriers 76 and 77 holding the bail vertical is desirable to facilitate this shifting. The bales can then be eased down the ramp, possibly supplemented by slow rearward movement of the vehicle to avoid having to push the bales along the ground with the chain system.

I claim:

1. A retrieving and collecting vehicle having a frame and means forming a load-receiving surface mounted on said frame, wherein the improvement comprises:

integral U-shaped means having the opposite ends thereof mounted for movement with respect to said frame along a path substantially parallel to said load-receiving surface, said bail ends also being pivotally mounted on a horizontal axis transverse to said path;

positioning means operative to locate the central transverse portion of said bail in spaced relationship above said load-receiving surface, said means forming a load-receiving surface having a loading end portion at least disposable adjacent ground level; and drive means operable to induce movement of said bail along said path.

2. A vehicle as defined in claim 1, wherein said means forming a load-receiving surface has an inclinable end portion forming a ramp, when inclined, to the remainder of said load-receiving surface 3. A vehicle as defined in claim 1, wherein said bail ends are positioned by track means disposed on opposite sides of said load-receiving surface.

4. A vehicle as defined in claim 3, additionally including sidewall means on opposite sides of said load-receiving surface, said bail central portion being movably supported by said sidewall means.

5. A vehicle as defined in claim 1, wherein said bail means is adapted to operate in alternative positions wherein said central transverse portion is on opposite sides of the pivotal mounting of the ends of said bail.

6. A vehicle as defined in claim 1, additionally including vehicle propulsion means operable to urge the end of said load-receiving surface against an object to be collected.

7. A vehicle as defined in claim 6, wherein said vehicle has a control station disposed at one side of said load-receiving surface.

8. A vehicle as defined in claim 7, wherein said propulsion means includes a motor disposed on the opposite side of said load-receiving surface from said central station, and a diagonally-disposed drive shaft extending from said motor to differential means.

* * * * *